Aug. 21, 1951  H. R. BLACK  2,564,950
GLASS-TO-METAL SEAL AND COMPOSITION THEREOF
Filed Jan. 31, 1947
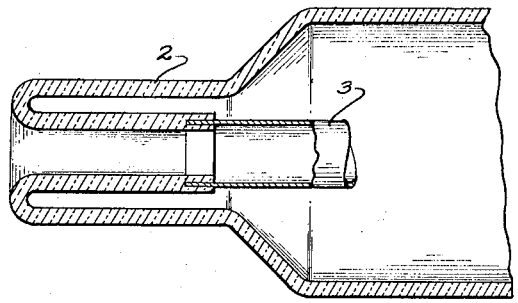
Inventor
HAROLD R. BLACK
By Rule and Hoge,
Attorneys Patented Aug. 21, 1951

2,564,950

UNITED STATES PATENT OFFICE 2,564,950

GLASS-TO-METAL SEAL AND COMPOSITION THEREOF

Harold R. Black, Toledo, Ohio, assignor to Owens-Illinois Glass Company, a corporation of Ohio Application January 31, 1947, Serial No. 725,745

5 Claims. (Cl. 49—92.5)

My invention relates to glasses and glass compositions, and more particularly to glasses adapted for use in the manufacture of X-ray tubes and other tubes or devices in which the glass is sealed to a metal or an alloy.

The present invention provides an all-purpose glass for use in the manufacture of X-ray tubes and other high voltage vacuum or gas-filled tubes. At the present day, in the manufacture of such tubes it is the practice to use three different glasses in the assembly of the tubes to attain a seal of the glass envelope of the tube to the metal or alloy used in such tubes. The use of several different glasses in this manner has been found necessary owing to the fact that known glasses having the required properties to serve as a glass envelope for such tubes, cannot be sealed directly to the metal. The coefficient of expansion of the glass for the envelope differs materially from that of the metal terminals, requiring the use of intermediate glasses to provide the needed expansion gradient for obtaining a reliable seal.

An object of the present invention is to provide a glass adapted to replace, in the manufacture of X-ray tubes and the like, the three glasses as conventionally employed, making it possible to build high voltage X-ray tubes and other high voltage vacuum or gas-filled tubes using only a single glass.

Glasses in use at the present day in the manufacture of X-ray tubes are subject to X-ray discoloration which is a highly objectionable feature. An object of the present invention is to provide a glass suitable for use in the manufacture of X-ray tubes and other high voltage tubes, which is not subject to X-ray discoloration to an objectionable degree.

A further object of the invention is to provide a glass for use in the manufacture of X-ray tubes, which has the necessary or desired characteristics of a glass envelope for such tubes, which also can be sealed directly to the metal used in such tubes, and which moreover is free from objectionable discoloration by X-radiation to which it is subjected.

A feature of the invention consists in providing a glass including in its composition cerium oxide in amounts, as hereinafter set forth, sufficient to serve as a preventer of X-ray discoloration and, at the same time, in small enough proportions to avoid devitrification of the glass, the latter also having the desired characteristics above pointed out.

In the accompanying drawing the figure is a fragmentary sectional view of an X-ray tube with a metal tube or ring sealed therein. The tube comprises an envelope 2 consisting of glass having a composition as hereinafter specified. A metal ring or tube 2 consisting of tungsten or an alloy of nickel, cobalt and iron, such as herein described, is in direct sealing contact with the glass.

I have discovered that a glass comprising the following metal oxides in substantially the percentages specified, embodies the characteristic features of the present invention above mentioned.

| | Per cent |
|---|---|
| Silica ($SiO_2$) | 64.90 |
| Boric oxide ($B_2O_3$) | 22.50 |
| Iron oxide ($Fe_2O_3$) | 0.03 |
| Aluminum oxide ($Al_2O_3$) | 4.90 |
| Sodium oxide ($Na_2O$) | 7.00 |
| Cerium oxide ($CeO_2$) | 0.50 |
| Antimony oxide ($Sb_2O_3$) | 0.11 |

A glass of the above composition has the following physical characteristics:

1. It wets and seals well with tungsten and with alloys comprising nickel, cobalt and iron, such as are now on the market and in use in the manufacture of X-ray and other high voltage tubes. The glass unites directly with the tungsten or alloy and forms a vacuumtight seal between the glass and the metal.
2. Fiber softening point—711° C.
3. Annealing point—505° C.
4. Strain point—475° C.
5. Electrical resistivity—5.5–6.6 ohms/cm.$^3$ $\log_{10}$ at 350° C.
6. Coefficient of expansion—$49 \times 10^{-7}$.
7. Density, 2.26 gms./cc.
8. Refractive index $N_D$, 1.482.

The above composition provides a comparatively soft glass with low electrical resistance, suitable for the manufacture of the envelopes of X-ray tubes and other high voltage tubes. The coefficient of expansion is close to that of tungsten and the alloys comprising nickel, cobalt and iron, above referred to. The expansion curve of the glass closely matches that of the tungsten and said alloys throughout the normal temperature range to which the tubes are subjected. The glass is thus well adapted for making a fused joint or seal with such metals.

One of the above mentioned alloys now on the market, under the trade name "Kovar," consists of 29 per cent nickel, 17 per cent cobalt, 0.3 per cent manganese, and the balance iron. Another such alloy, marketed under the trade name "Fernico," has the following composition; namely, 54 per cent iron, 28 per cent nickel, and 18 per cent cobalt.

It will be understood that the present invention is not limited to the exact proportions of the ingredients given in the above specified composition, and that other oxides than those given might be introduced in small amounts occurring either as impurities or introduced for specific purposes such as recognized by those skilled in the art.

In the use of the above described glass for X-ray tubes, the cerium oxide serves the important purpose of preventing X-ray discoloration or reducing it to an extent to provide a glass acceptable to the trade in this respect. The amount of $CeO_2$ specified, namely 0.5 per cent, is the maximum permissible percentage. It is found that an amount in excess of 0.5 per cent causes devitrification during the working of the tube. The amount of cerium oxide may be reduced somewhat. 0.3 per cent has been found to be the minimum limit of cerium oxide that will give sufficient resistance to X-ray discoloration.

While the above composition is given as an example of a borosilicate glass embodying the present invention, it is to be understood that the invention includes all borosilicate glasses in which cerium oxide is used in the proportions above given, and coming within the scope of the appended claims.

I claim:

1. A glass consisting of the following oxides and in substantially the following proportions, namely:

| | Parts |
|---|---|
| Silica | 64.90 |
| Boric oxide | 22.50 |
| Iron oxide | 0.08 |
| Aluminum oxide | 4.90 |
| Sodium oxide | 7.00 |
| Cerium oxide | 0.50 |
| Antimony oxide | 0.11 |

2. A glass comprising the following oxides and in substantially the following proportions, namely:

| | Per cent |
|---|---|
| Silica | 64.90 |
| Boric oxide | 22.50 |
| Iron oxide | 0.08 |
| Aluminum oxide | 4.90 |
| Sodium oxide | 7.00 |
| Cerium oxide | 0.30–0.50 |
| Antimony oxide | 0.11 |

3. A vacuumtight seal between the glass as defined in claim 1 and an alloy comprising essentially iron, nickel, and cobalt in about the proportions of 54 parts iron, 28 parts nickel and 18 parts cobalt.

4. A vacuumtight seal between a borosilicate glass suitable for forming the envelope of high voltage tubes and an electrical conductor comprising about 54 parts iron, 28 parts nickel and 18 parts cobalt, and having an expansion curve which closely matches that of the glass, said glass having the composition defined in claim 2.

5. The vacuumtight seal between the glass as defined in claim 2 and an alloy comprising essentially iron, nickel, and cobalt in about the proportions of 54 parts iron, 28 parts nickel, and 18 parts cobalt.

HAROLD R. BLACK.

REFERENCES CITED

The following references are of record in the file of this patent:

UNITED STATES PATENTS

| Number | Name | Date |
|---|---|---|
| 1,545,509 | Montgomery et al. | July 14, 1925 |
| 2,049,765 | Fischer | Aug. 4, 1936 |
| 2,071,196 | Burger et al. | Feb. 16, 1937 |
| 2,167,482 | Hull et al. | July 25, 1939 |
| 2,226,418 | Tillyer et al. | Dec. 24, 1940 |
| 2,408,468 | Lyon | Oct. 1, 1946 |
| 2,426,472 | Stanworth | Aug. 26, 1947 |

OTHER REFERENCES

Glass: The Miracle Maker, Pitman Publishing Co., New York, 1941.